July 16, 1957  F. BORGES  2,799,299
APPARATUS FOR TREATING CEREALS
Filed Nov. 29, 1954  2 Sheets-Sheet 1
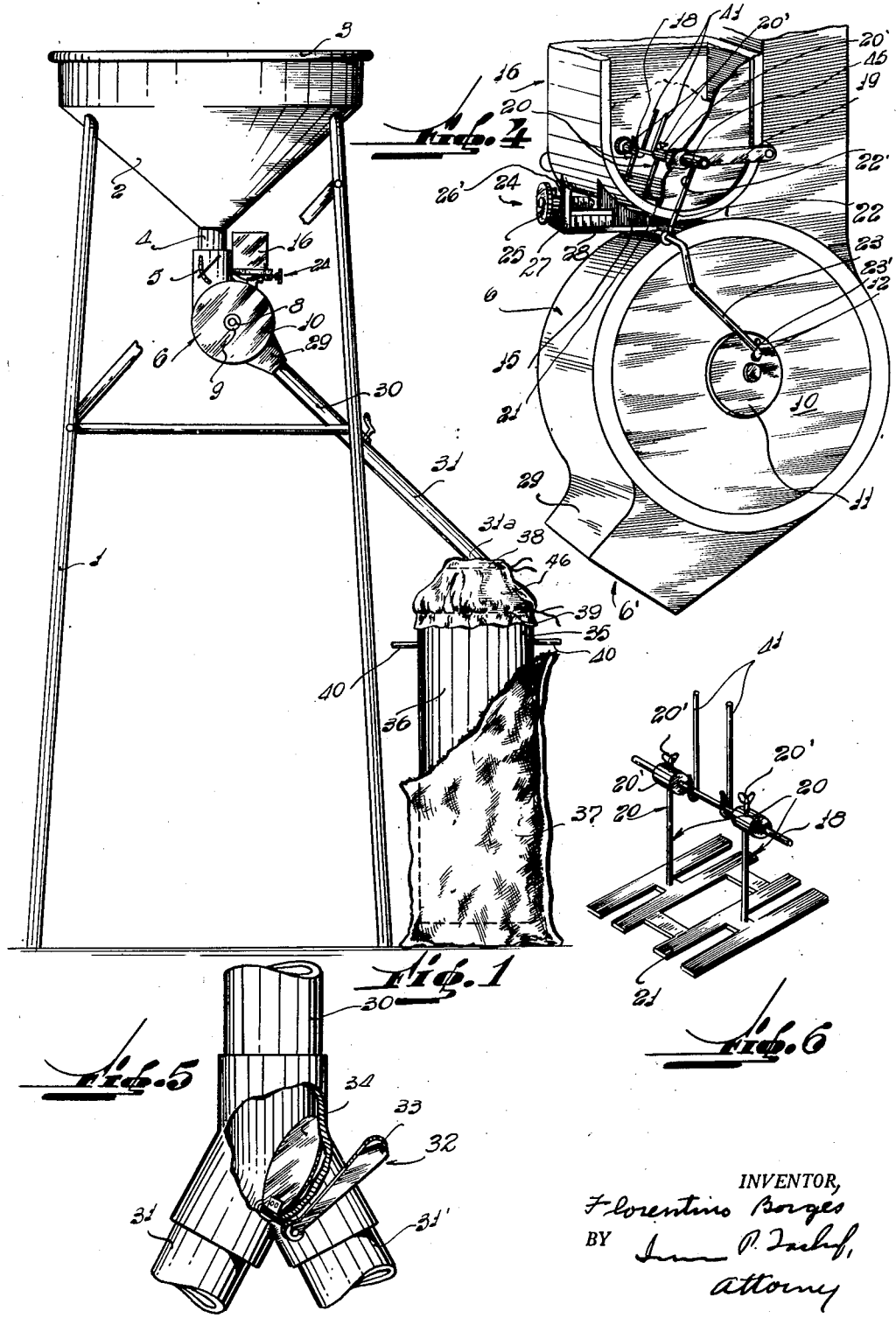
INVENTOR,
Florentino Borges
BY
attorney

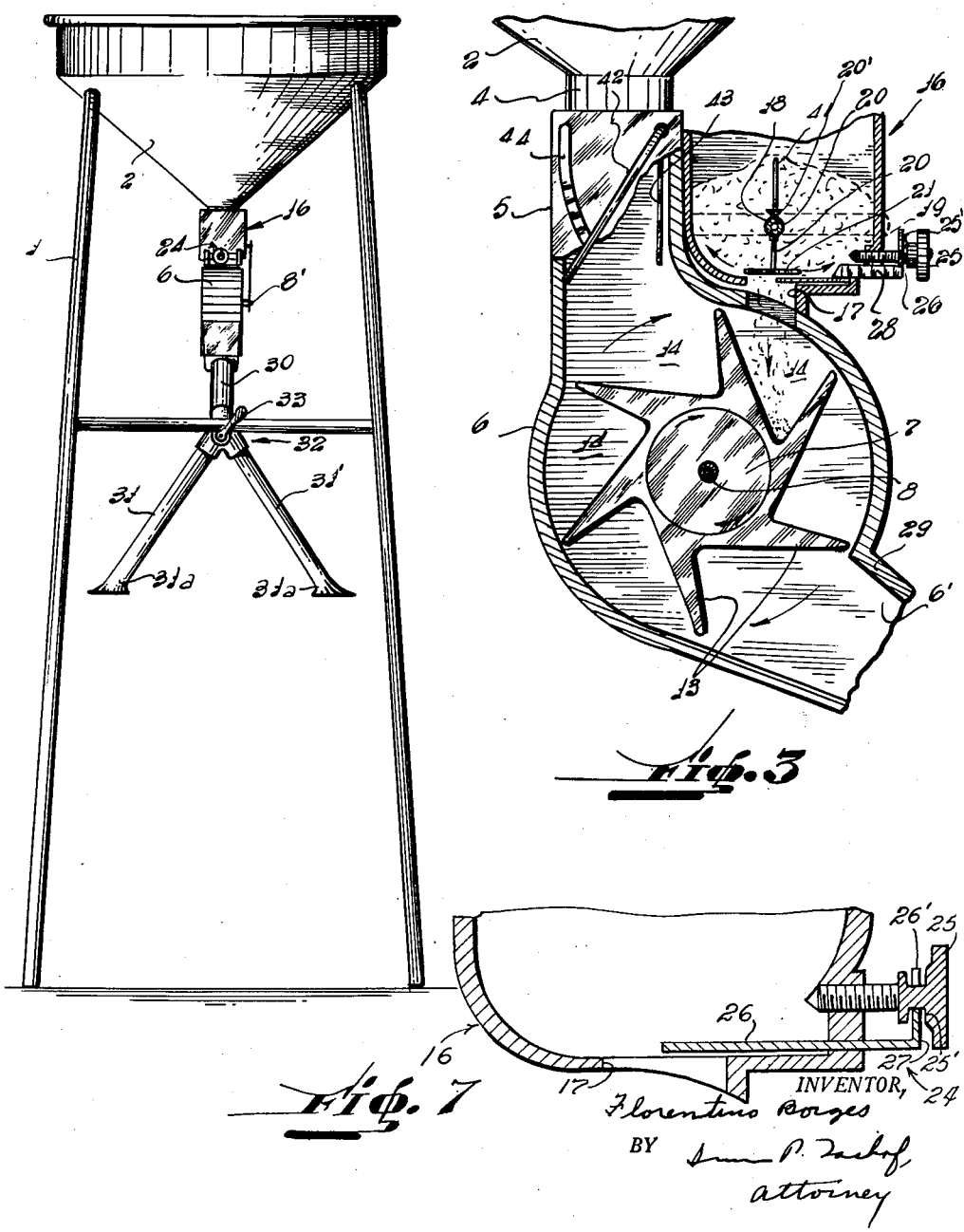

United States Patent Office 2,799,299
Patented July 16, 1957

2,799,299
APPARATUS FOR TREATING CEREALS

Florentino Borges, Estacion Nueva Mheles, Uruguay

Application November 29, 1954, Serial No. 471,823

6 Claims. (Cl. 141—69)

This invention relates to an apparatus for treating cereals and the like, with pest destroying plaguicides, fertilizers and the like.

Cereals must be frequently treated before their storage with certain usually powderlike ingredients in order to protect the corn against several diseases generally spread by insects, or the corn should be treated with fertilizing ingredients when the cereals are for seeding purposes.

The expression "treating cereals" hereinafter used is to be understood as defining any type of treatment either to destroy diseases, plagues or the like of the cereals or the corn as well as to enrich the latter such as by fertilizers, etc.

The operation of mixing said ingredients with cereals is a task that always presents difficulties, especially in distributing uniformly said ingredients amongst the cereal in order to provide the maximum protection and to employ the minimum amount of treating material.

To the present time, the operation of treating cereals has been a difficult and prolonged one and has required to work of several men for a comparatively small amount of corn.

Furthermore up to now both during the treatment as well as when pouring the treated corn into sacks, bags or the like, the powderlike treating material forms a cloud which is always annoying and, particularly when said treating materials are toxic, may constitute a danger for the workmen's health.

An object of this invention is to provide an apparatus capable of overcoming all the cited draw-backs, that is to say an apparatus adapted to perform the treating of cereals with powderlike treating materials, so that the latter might be uniformly distributed amongst the corn at the same time as the amount of treating material required is reduced to a minimum.

A further object of this invention is to provide an apparatus for treating cereals and the like which is provided with branch conduits, connected to a feeding channel which enables the filling of bags of treated cereals in a continuous way.

A further object of this invention is to provide a device for filling the sacks with treated corn by means of which the treating material will not spread away from the corn.

A further object of this invention is to provide an apparatus of simple structure and handling.

Other objects and advantages of this invention will become more apparent from the following description wherein an embodiment is described by way of example.

In the drawings:

Figure 1 is a side elevation of the apparatus for treating cereals, according to this invention.

Figure 2 is a partial front view of Fig. 1, wherein the filling device has been omitted.

Figure 3 is a longitudinal section of the rotor casing showing the rotor mounted therein and the secondary hopper.

Figure 4 is a perspective view of the rotor casing and the secondary hopper partially in section, so as to show the stirring device thereof.

Figure 5 is a detail of Fig. 2.

Figure 6 is a perspective view of part of the stirring means.

Fig. 7 is a sectional elevation on an enlarged scale showing the details of the slidable control valve.

As may be seen in Figures 1 and 2, the apparatus for treating cereals according to this invention comprises a supporting frame 1 which supports a funnel like main hopper 2 for the reception of the cereals to be treated. Said main hopper 2 comprises a charge opening 3 and a discharge opening 4, the latter being connected through a register conduit 5, with a cylindrical casing 6. Said cylindrical casing 6 comprises a rotor 7 (see Fig. 3) rotatably mounted on a shaft 8 supported on suitable bearings 9 (only one visible in Fig. 1) mounted on the side walls 10 of said casing 6.

The end portion 8' (see Fig. 2) of shaft 8 projects beyond said wall 10 and rigidly supports an eccentric 11, having a plurality of radially disposed holes 12, as can be seen in Fig. 4.

Said rotor 7 (see Fig. 3) comprises a plurality of blades 13, each adjacent pair of which defines compartments 14.

The casing 6 has in its bottom portion a discharge opening 6' substantially oppositely arranged to the discharge opening 4 of said main hopper 2.

A secondary hopper 16 is linked and supported by said casing 6 by means of supporting members 15. Said secondary hopper 16, stores and supplies the treating material and has in its bottom portion a discharge opening 17 which is connected to said casing 6.

There are stirring means provided in said secondary hopper 16 comprising a stirring shaft 18 rotatably supported by bearings (not shown) mounted on supporting members 19 (see also Fig. 4).

On said stirring shaft 18 (see also Fig. 6) there is mounted a pair of holders 20 fastened to said shaft 18 by means of screws 20' and which holders 20 support a grid-like agitator 21 swingably mounted in front of said secondary hopper discharge opening 17, for cooperating in the supply of treating material, as will be latter explained. A plurality of stirring teeth 41 supported by stirring shaft 18 radially project therefrom to assure a good feeding towards the agitator 21.

Said stirring shaft 18 is linked to said eccentric 11 by means of a pair of pivotally interconnected arms 22 and 23. The free end 22' of arm 22 is connected by means of a connecting sleeve 45 to said stirring shaft 18, and the hooked free end 23' of arm 23 engages one of said holes 12 in said eccentric 11.

The secondary hopper 16 includes a slidable check valve 24 for controlling the flow of the treating material through discharge opening 17. The valve 24 includes a slidable valve plate 26 the position of which with respect to the discharge opening 17 is adjustable by means of the control screw 25.

Referring to Figure 7 where the valve 24 is shown in detail, treating material is contained within the secondary hopper 16 and the inner extremity of plate 26 partially obstructs passage of the treating material through the discharge opening 17. The plate 26 is formed with an outer upstanding flange 27 having a notch 26' through which a control screw 25 projects. The inner end of the screw 25 is in threaded engagement with the body of the hopper 16 and the head of the screw 25 is formed with a circular groove 25' which fits into the notch 26' so that rotation of screw 25 will axially displace the screw and move the plate 26 therewith. The side of plate 26 is formed with a scale 28 (see Figure 3) so that the extent to which the plate 26 obstructs the opening 17 can be observed.

The casing discharge opening 6' is defined by a conduit 29 to which a feeding channel 30 is connected having a pair of branch conduits 31, 31' remote from said conduit 29. Each of said branch conduits 31 and 31' is connected to sack filling means.

Said feeding channel 30 includes a two way valve 32 (which can be seen in detail in Fig. 5) comprising a lever 33 operatively connected to a swingable flap valve 34 capable of adopting to end positions closing in each of them one of said branch conduits 31 or 31'.

Each sack filling means comprises a flexible cover connection 46 (see Figure 1) preferably made of fabric, which is a coupling between the end portion 31a of the branch conduit and the upper opening 35 of a cylindrical tube 36, to be placed into each sack to be filled such as sack 37.

Said cover 46 has hems 38 and 39 with strings in order to fasten the sleeve to the end portion 31a and the opening 35, respectively.

Said cylindrical tube 36 includes handles 40 adjacent opening 35 for removing said tube from the filled sacks.

Since the other branch 31' has exactly the same filling means, they will not be redescribed. Obviously a larger number of branches and sack filling means may be provided, in which event a multiway valve would have to replace the two way valve 32.

The apparatus according to the present invention operates as follows:

The cereal is fed to the main hopper 2 and the treating material to the secondary hopper 16 flowing through their respective discharge openings 4 and 17 to the interior of casing 6.

Shaft 8 is driven by any suitable driving means (not shown). Due to the rotation of rotor 7, said compartments 14 will successively face said discharge openings 4 and 17 so that the treating material is discharged into the compartments 14 already having the cereal. Due to the further rotation of rotor 7, obviously the treating material will be more or less uniformly distributed amongst the corn.

The rotary movement of said rotor 7 is transmitted to the eccentric 11; the rotation of the latter is transformed into an oscillating movement by means of interconnected arms 22 and 23 whereby the stirring shaft 18 transmits said last mentioned movement to the agitator 21, and stirring teeth 41.

The election of the hole which the hooked portion 23' of arm 23 should engage depends on the kind of treating material to be employed.

The amount of treating material added to the cereal may be altered by means of the control screw 25 so as to open more or less the discharge opening 17 covered by the slidable plate 26.

The treated cereal passes through the feeding channel 30 to the branch conduits 31 or 31' (depending which of them is closed by the flap valve 32) and from one of said branch conduits through the corresponding cylindrical tube 36 to the bags in which the cereal is to be collected thus preventing the spread of treating material through the sacks' fabric as it would if the tube 36 is not placed into the bag 37 during the filling operation.

Once the tube 36 is filled the lever 33 is inverted, thus stopping the flow of treated cereal in one branch and directing this flow to the other branch. While the other sack is being filled an operator proceeds to replace the filled sack for an empty one, previously lifting the cylindrical tube 36 by means of the handles 40 and sliding it along its branch, for removing it from the sack which is thus filled and then closed.

If desired, register means may be provided in the register conduit 5 controlling the cereal flow and which comprise a lever 42 (see Fig. 3) for operating a swingable gate 43. Corrugated blocking means 44 are in operative relationship with lever 42.

Obviously shaft 8 may be hand operated or driven by a motor as is well known in the art.

I claim:

1. Apparatus for treating cereals and the like comprising a main hopper for the reception of cereal including a first charge opening and a first discharge opening, a secondary hopper for the reception of treating material including a second charge opening and a second discharge opening, a shaft, a rotor mounted on said shaft and comprising a plurality of blades defining a plurality of compartments, a casing defining a chamber and having a third discharge opening, said first discharge opening and said second discharge opening being connected to said chamber, said rotor being rotatably mounted in said casing and said compartments being adapted to face said first and second discharge openings for receiving the cereal and the treating material successively, said first discharge opening being substantially oppositely arranged to said third discharge opening, a feeding channel having a first end and a second end said first end being connected to said third discharge opening, a stirring device comprising an eccentric, a pair of pivotally interconnected arms having a first end portion and a second end portion and an agitator, said eccentric being mounted on said shaft, said first end portion being connected to said eccentric, said second end portion being connected to said agitator, said agitator being swingably mounted in said secondary hopper facing said second discharge opening, a plurality of branches connected to said second end portion and sack filling means connected to each of said branches.

2. Apparatus for curing cereals and the like comprising a main hopper for the reception of cereal including a first charge opening and a first discharge opening, a secondary hopper for the reception of treating material including a second charge opening and a second discharge opening, a shaft, a rotor mounted on said shaft and comprising a plurality of blades defining a plurality of compartments, a casing defining a chamber and having a third discharge opening, said first discharge opening and said second discharge opening being connected to said chamber, said rotor being rotatably mounted in said casing and said compartments being adapted to face said first and second discharge openings for receiving the cereal and the treating material successively, said first discharge opening being substantially oppositely arranged to said third discharge opening, a feeding channel having a first end and a second end connected to said third discharge opening, a stirring device comprising an eccentric, a pair of pivotally interconnected arms having a first end portion and a second end portion, a stirring shaft and an agitator, said eccentric being mounted on said rotor shaft, said first end portion being connected to said eccentric, said second end portion being connected to said stirring shaft, said agitator being supported by said stirring shaft and swingably mounted in said secondary hopper facing said second discharge opening, a plurality of branches connected to said second end portion, sack filling means connected to each of said branches and comprising a tube for introducing into a sack and having an upper opening, a flexible tubular coupling connecting said upper opening with one of said branches, handles adapted to said tube for removing it from said sack.

3. Apparatus for curing cereals and the like comprising a main hopper for the reception of cereal including a first charge opening and a first discharge opening, a secondary hopper for the reception of treating material including a second charge opening and a second discharge opening, a shaft, a rotor mounted on said shaft and comprising a plurality of blades defining a plurality of compartments, a casing defining a chamber and having a third discharge opening, said first discharge opening and said second discharge opening being connected to said chamber, said rotor being rotatably mounted in said casing and said compartments being adapted to face said first and second discharge openings for receiving the cereal and treating material successively, said first discharge opening being substantially oppositely arranged to said third discharge opening, a feeding channel having a first end and a second end connected to said third discharge opening, a stirring device comprising an eccentric, a pair of pivotally interconnected arms having a first end portion and a second end portion, a stirring shaft and an agitator, said eccentric being mounted on said rotor shaft, said first end portion being connected to said eccentric, said second end portion being connected to said stirring shaft, said agitator being supported by said stirring shaft and swingably mounted in said secondary hopper facing said second discharge opening, a series of stirring teeth integral with said stirring shaft a plurality of branches connected to said second end portion, sack filling means connected to each of said branches and comprising a tube for introducing into a sack and having an upper opening, a flexible tubular coupling connecting said upper opening with one of said branches, handles adapted to said tube for removing it from said sack, said feeding channel including a two way valve comprising a lever and a swingable flap valve said lever connected to said flap valve, said flap valve being adapted to close one of said branches having open the other.

4. Apparatus for curing cereals and the like comprising a main hopper for the reception of cereal including a first charge opening and a first discharge opening, a secondary hopper for the reception of treating material including a second charge opening and a second discharge opening, a shaft, a rotor mounted on said shaft and comprising a plurality of blades defining a plurality of compartments, a casing defining a chamber and having a third discharge opening, said first discharge opening and said second discharge opening being connected to said chamber, said rotor being rotatably mounted in said casing, and said compartments being adapted to face said first and second discharge openings for receiving the cereal and the treating material successively, said first discharge opening being substantially oppositely arranged to said third discharge opening, a feeding channel having a first end and a second end connected to said third discharge opening, a stirring device comprising an eccentric, a pair of pivotally interconnected arms having a first end portion and a second end portion and an agitator, said eccentric being mounted on said shaft, said first end portion being connected to said eccentric, said second end portion being connected to said agitator, said agitator being swingably mounted in said secondary hopper above said second discharge opening, at least two branches connected to said second end portion, sack filling means connected to each of said branches, check valve means in said second discharge opening for controlling the flow of the treating material and comprising a slidable plate valve, a control screw, said slidable plate valve being structurally connected to said control screw, said control screw being screwed into said secondary hopper.

5. Apparatus for treating cereals and the like comprising a main hopper for the reception of cereal including a first charge opening and a first discharge opening, a secondary hopper for the reception of treating material including a second charge opening and a second discharge opening, a shaft, a rotor mounted on said shaft and comprising a plurality of blades defining a plurality of compartments, a casing defining a chamber and having a third discharge opening, said first discharge opening and said second discharge opening being connected to said chamber, said rotor being rotatably mounted in said casing and said compartments being adapted to face said first and second discharge openings for receiving the cereal and the treating material successively, said first discharge opening being substantially oppositely arranged to said third discharge opening, a feeding channel having a first end and a second end, said first end being connected to said third discharge opening, a stirring device comprising an eccentric, a pair of pivotally interconnected arms having a first end portion and a second end portion and an agitator, said eccentric being mounted on said shaft, said first end portion being connected to said eccentric, said second end portion being connected to said agitator, said agitator being swingably mounted in said secondary hopper facing said second discharge opening, a plurality of branches connected to said second end portion, sack filling means connected to each of said branches, a register conduit between said first discharge opening and said casing defining said chamber, register means in said register conduit for controlling the flow of the cereal and comprising a lever and a swingable gate said lever being connected to said swingable gate and swingably mounted in said register conduit.

6. Apparatus for treating cereals and the like comprising a main hopper having a discharge opening, a second hopper having a discharge opening, a shaft, a rotor mounted on said shaft and comprising a plurality of blades defining a plurality of compartments, a casing defining a chamber having a discharge opening, the discharge openings of said main and second hoppers being connected to said chamber, said rotor being rotatably mounted in said casing and said compartments being adapted to face the discharge openings of said hoppers for receiving material discharged therefrom successively, said main discharge opening being substantially oppositely arranged with respect to the discharge opening of said casing, an agitator swingably mounted in said second hopper and facing the discharge opening thereof, means movable with said shaft for swinging said agitator and means adapted for the filling of sacks associated with the discharge opening of said casing.

No references cited.